Patented Jan. 28, 1947

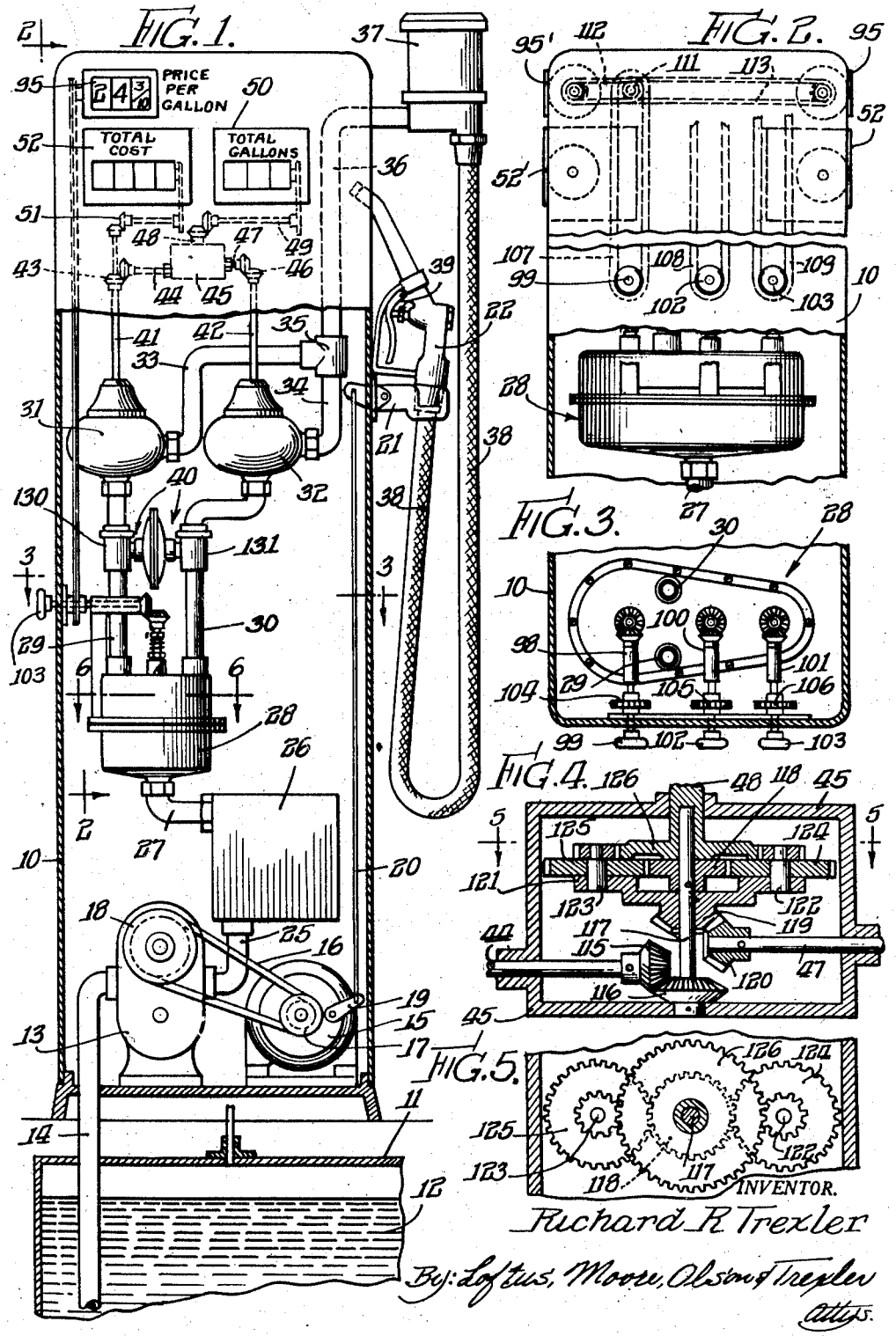

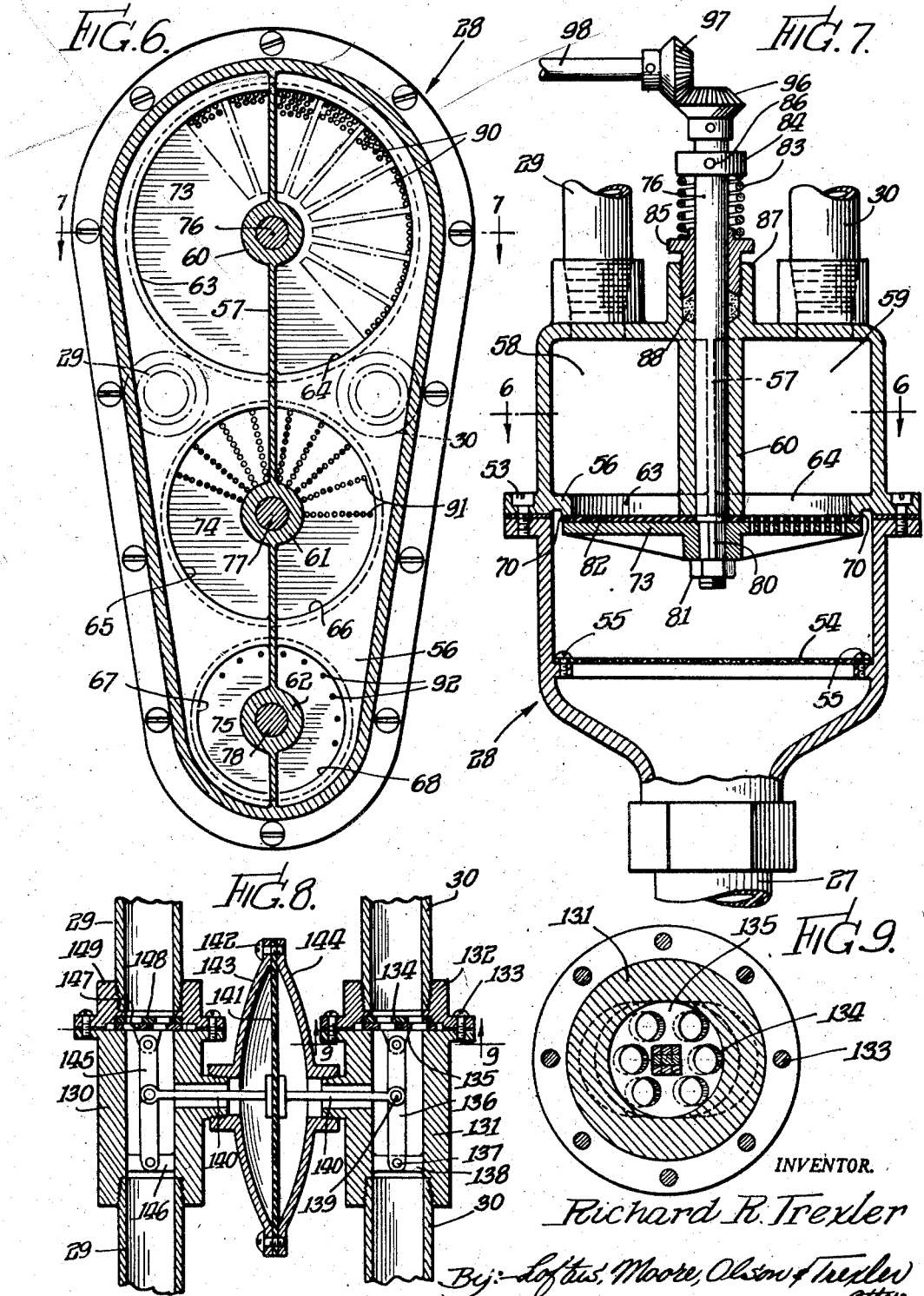

2,414,842

UNITED STATES PATENT OFFICE 2,414,842

LIQUID DISPENSING APPARATUS

Richard R. Trexler, Evanston, Ill.

Application January 18, 1943, Serial No. 472,709

17 Claims. (Cl. 222—26)

This invention relates to fluid dispensing apparatus, and particularly to apparatus adapted to dispense liquids in measured quantities while simultaneously registering the volume and calculating and registering the cost thereof at a given or selected price per unit of volume.

It is an object of the invention to provide a fluid dispensing apparatus of improved construction and operating characteristics, and more particularly to provide improved means for calculating and registering the volume and cost of the fluid or liquid dispensed.

In accordance with the principles of the invention cost calculating fluid variator means is disposed directly in the flow line of the dispensed fluid, said means controlling the flow of fluid within a selected portion of the line in a manner so as to enable the accurate cost calculation thereof at variable and selected prices per unit of measure; meters also being arranged in the line and associated with registering devices in a manner so as to effect the registration of both the volume and the cost of the fluid or liquid dispensed.

Further objects of the invention are to provide volume and cost calculating means, in apparatus of the type stated, which may be more economically constructed, and which is accurate in operation and readily adjustable to effect volume calculation and cost calculations at variable and selected unit prices.

A still further object of the invention is to provide for the volume and cost calculation of the fluid dispensed, in a fluid dispensing apparatus, without varying the operating characteristics or displacement mechanism of the meters provided, and without the provision of mechanical variator means or other cumbersome mechanism.

Another object of the invention is to provide in apparatus of the type stated, for a minimum load upon the meter or meters provided, whereby to facilitate accurate meter operation, and also to distribute the operational requirements of the meters, and combine the movements thereof, in an improved and expeditious manner.

Various other objects, advantages and features of the invention will be apparent from the following specification when taken in connection with the accompanying drawings, wherein certain preferred embodiments of the invention are set forth for purposes of illustration.

In the drawings, wherein like reference numerals refer to like parts throughout:

Fig. 1 is a general assembly view of a liquid dispensing apparatus constructed in accordance with the principles of the invention, parts of the apparatus housing being broken away to better illustrate certain of the structural elements;

Fig. 2 is a partial side and sectional view of the apparatus shown in Fig. 1, and taken on the line 2—2 thereof;

Fig. 3 is a partial horizontal sectional view through the apparatus of Fig. 1, on the line 3—3 thereof;

Figs. 4 and 5 are sectional and plan views, respectively, of the differential gearing used to combine the movements of the two meters, to effect the volume registrations;

Fig. 6 is a detail horizontal sectional view, on an enlarged scale, of the fluid variator structure, and taken on the lines 6—6 as indicated in Fig. 1 and Fig. 7;

Fig. 7 is a detail vertical sectional view of the fluid variator on the line 7—7 of Fig. 6;

Fig. 8 is a detail sectional view of a control valve structure optionally but preferably forming a part of the structure of Fig. 1; and Fig. 9 is a detail sectional view of a portion of the valve mechanism of Fig. 8, on the line 9—9 thereof.

Referring more specifically to the drawings, in Fig. 1 the dispensing apparatus illustrated may be of the general type ordinarily provided for the dispensing of gasoline for automotive vehicle use, although it is to be understood that the invention in its various aspects is not limited to apparatus of this character. The dispensing apparatus illustrated comprises an upstanding housing 10 adapted to be associated with an underground storage tank 11 containing the liquid 12 forming the supply source for the dispensing apparatus.

A dispensing pump 13 which may be of any conventional type, and provided with a by-pass valve or the like, draws the liquid 12 from the underground tank into the pump by means of a pump inlet pipe 14. The pump is driven by an electric motor or other suitable prime mover 15 through the intermediary of a belt 16 and associated pulleys 17 and 18. The motor is controlled by a switch 19 actuated by a rod 20 connected to the nozzle support 21 which is pivotally mounted upon the housing 10 and is adapted to be pivoted upwardly when the dispensing nozzle 22 is removed therefrom. The arrangement is such that when the nozzle is pivoted upwardly, as stated, switch 19 is operated to energize the driving motor 15.

The dispensing pump 13 propels the dispensed liquid through an outlet pipe 25 into an air and vapor eliminator 26 which may be of conventional construction. An outlet pipe 27 leads from the air eliminator to a fluid variator 28, the construction of which will be hereinafter described. Within the fluid variator the fluid or liquid flow may be divided, and passes therefrom through a pair of parallel pipes or conduits 29 and 30. A meter 31 is associated with the pipe 29 for measuring the liquid flow therethrough, whereas a meter 32 is associated with the pipe 30 for measuring the liquid which passes through the latter. An outlet pipe 33 leads from the meter 31, and an outlet pipe 34 leads from the meter 32, the pipes 33 and 34 being joined by a T connection 35. The combined fluids from both meters flow outwardly through the pipe 36 to a sight gauge 37, and then to the usual flexible hose 38 and dispensing nozzle 22 provided with a manual control valve 39. The meters 31 and 32 may be of any suitable construction, the meters being provided with the usual calibrating means, to insure accuracy of measurement, as will be understood by those familiar with the art.

A control valve arrangement, generally indicated by the numeral 40, may be provided in association with the pipes 29 and 30, for controlling pressure conditions therein. The purpose and function of this control valve arrangement will be later described.

The meter 31 is arranged to drive a shaft 41 whereas the meter 32 is arranged to drive a shaft 42. The shaft 41 has a bevel gear 43 fixed thereto arranged to drive a shaft 44 leading to a differential gearing 45. Similarly the meter shaft 42 is provided with a bevel gear 46 arranged to drive a shaft 47 also leading to the differential gearing 45. This differential gearing, which may be of any suitable contruction and the details of which will be later described, combines the rotational movements of the shafts 44 and 47, the combined rotational movements being transmitted to an output shaft 48 leading from the differential. This shaft 48 is adapted by means of suitable drive connections 49 to drive a volume register 50 for indicating the volume of the liquid dispensed. The meter shaft 41 is also arranged by means of suitable drive connections 51 to effect the actuation of a cost register 52 for registering the cost of the liquid dispensed. It will be seen that the cost register 52 is driven solely by the meter 31 whereas the volume register 50 is driven from both meters 31 and 32 through the differential gearing 45. As shown in Fig. 2 and as indicated by the reference numeral 52', the volume and cost registers may be duplicated on the opposite sides of the housing 10, both sets of registers being arranged for simultaneous operation from the driving shafts.

The fluid variator structures, and their arrangement with the other elements of the system, are shown in Figs. 1, 2, 3 6 and 7. The fluid variator, generally indicated by the numeral 28 in Figs. 2, 3, 6 and 7, comprises a two-part casing or housing, viz., an upper housing portion and a lower housing portion, flanged and connected together by means of bolts or screws 53. The lower casing portion carries a fine screen 54, Fig. 7, held in position by screws 55. This screen effects an even distribution of the liquid received into the fluid variator from the pipe 27, causing the fluid to tend to move upwardly through the variator with substantially uniform velocity over its entire horizontal cross sectional area.

As best shown in Figs. 6 and 7, the upper casing section of the fluid variator is provided with a face plate portion 56 forming a horizontally extending barrier across the entire casing structure. Formed integral with the plate 56 is a vertically extending baffle wall 57, this baffle wall effecting a separation of the upper casing into two separated chambers 58 and 59 associated, respectively, with the pipe 29 leading to the meter 31, and the pipe 30 leading to the meter 32. The baffle wall 57 is provided with three enlarged bearing bosses 60, 61 and 62, at preselected spaced points along its length, and the plate 56 is provided with semi-circular openings 63 and 64, concentric with the boss 60, with semi-circular openings 65 and 66, concentric with the boss 61, and with semi-circular openings 67 and 68, concentric with the boss 62. These openings project up to but not through the plane of the vertically disposed baffle wall 57. In other words, the adjacent ends of the openings are spaced apart by a distance equal to the thickness of the baffle wall 57.

The separator plate or wall 56 is provided with three circular raised or embossed portions 70 through which the openings are cut, whereby to provide bearing surfaces for engagement by the variator disc presently to be described. There are three of these embossed or raised portions 70, one for each pair of openings, and each of the embossed portions forms a complete circle whereby to provide complete circular and fluid-tight bearing surfaces for the variator discs. The pipes or conduits 29 and 30 are indicated by dot and dash lines in Fig. 6 to diagramatically show the location of these outlet pipes, dot and dash lines being used to indicate that the pipes are physically arranged in the structure, above the section line along which Fig. 6 is taken.

Referring further to Figs. 6 and 7, three variator discs as indicated at 73, 74 and 75 are associated, respectively, with the openings 63—64, 65—66 and 67—68; these discs being keyed or otherwise fixed to the ends of shafts 76, 77 and 78 journaled in the bearing bosses 60, 61 and 62. The manner in which the disc 73 is keyed to the end of its associated shaft 76 is shown in Fig. 7, the connection comprising a key 80 and a nut 81 threaded onto the end of the shaft for holding the disc in position. Similar mounting means may be employed for securing the other discs 74 and 75, respectively, onto their associated shafts 77 and 78. As also best shown in Fig. 7, each of the variator discs is preferably provided with a bearing washer as shown at 82, of neoprene or the like, for fluid-tight bearing engagement against the associated plate boss 70. A compression spring 83, Fig. 7, bearing at its upper end against a collar 84 and at its lower end against a packing gland member 85 maintains the washers 82 and bosses 70 in fluid-tight bearing engagement. The particular spring 83 illustrated in Fig. 7 is associated with the shaft 76 and its variator disc 73, but it is to be understood that similar means is provided for each of the variator disc structures. The collar 84 is adjustable on the shaft 76 by means of a set screw 86 whereby to properly control the compression of the spring 83. Also, the packing gland member 85 is threaded into a boss 87 provided as a part of the upper casing, whereby to effect the compression of a packing 88, preventing liquid leakage along the shaft 76. As indicated, similar means is provided for each of the three variator disc shafts.

Disc 73, which is the "tens" variator disc, is provided with nine blocks of openings 90, there being one hundred openings or holes in each block. Disc 74, which is the "units" variator disc, is provided with nine blocks of openings 91, there being ten holes in each block. Disc 75, which is the "tenths" variator disc, is provided with nine openings 92. The individual openings or holes in each of the discs are of the same size. Accordingly, it will be seen that at the same fluid or liquid pressures, each block of openings 91 in the disc 74 will pass ten times as much liquid as each opening 92 in the disc 75, whereas each block of openings 90 in the disc 73 will pass ten times as much liquid as each block of openings 91 of disc 74 or one hundred times as much as the individual openings 92 of disc 75. Each of the variator discs is independently rotatably adjustable, the arrangement being such that the blocks of openings in the cases of discs 73 and 74, or the individual openings, in the case of disc 75, may be exclusively on one side of the baffle wall 57, or on the other side thereof, or divided in any desired proportion. Those holes which are set to discharge into the variator chamber 58 transmit fluid or liquid which will be measured by the meter 31, which is directly connected to the cost register. Accordingly, it will be seen that the setting of the variator discs will determine the proportion of the fluid or liquid which will be measured by the meter 31, in relation to that which is by-passed around the meter 31 through the pipe 30. Adjustment of the discs in accordance with the selected unit price per unit of volume will therefore effect the proper actuation of the meter 31 in proportion to the unit price and the associated directly connected cost register, in a manner to cause the cost register to accumulate and register the proper cost of the dispensed fluid at the selected unit price per unit of volume. For example, in Fig. 6 the variator discs are set to compute the dispensed liquid at a unit price per gallon of 24.3 cents, the unit price indicated on the "price per gallon" register 95, Fig. 1. The variator illustrated can effect the calculation of costs at unit prices from one-tenth of a cent per gallon to 99.9 cents per gallon, although in ordinary usage the variator is not called upon to effect calculation over this wide a price variation or range.

The means for effecting the adjustments of the discs are best shown in Figs. 1, 2, 3 and 7. As shown in Fig. 7, the upper end of shaft 76 is provided with a bevel gear 96 meshing with a bevel gear 97 fixed to a shaft 98 which shaft, as best shown in Fig. 3, projects outwardly through the side of the housing 10 and is provided with an operating knob 99. Similar means is provided for each of the variator discs, the adjustment shaft for the "units" disc 74 being indicated at 100 in Fig. 3, and the adjustment shaft for the "tenths" disc being indicated at 101. Shaft 100 is provided with an operating knob 102 and shaft 101 is provided with an operating knob 103. Sprockets 104, 105 and 106 are provided, respectively, on the shafts 98, 100 and 101, these sprockets being connected by chains 107, 108 and 109, Fig. 2, so as to effect the actuation of the adjustable dials of the price per gallon indicator 95 provided on the front of the housing, and also preferably a duplicate price per gallon indicator 95' on the rear housing face. To this end the chain 107 for the "tens" shaft 98 is arranged to actuate a sprocket 111 connected by means of chains 112 and 113 to the "tens" dials of the indicators 95 and 95'. Similar connections, not shown, are provided between the "cents" or "units" chain 108 and the "cents" register dials, and between the "tenths" chain 109 and the "tenths" register dials. Accordingly, it will be seen that selective adjustment of the knobs 99, 102 and 103 effects the corresponding adjustment of the variator discs, and the simultaneous adjustment of the dials of the price per gallon indicators.

The details of the differential gearing 45 are illustrated in Figs. 4 and 5. As shown, a planetary type of differential gearing is provided, although it is to be understood that any suitable form of conventional differential gearing may be used. As illustrated, shaft 44, which is driven from the meter shaft 41, is provided on its inner end with a bevel gear 115. This bevel gear is adapted to drive a bevel gear 116 secured to a shaft 117 having a gear 118 fixed thereto. Loosely mounted on shaft 117 is a bevel gear 119 adapted to be driven from a bevel gear 120 secured on the end of shaft 47 driven from the meter shaft 42.

Bevel gear 119 has formed thereon a flange portion 121 carrying a pair of pins 122 and 123 forming journals for a pair of stepped planet gears 124 and 125. The lower portions of these stepped planet gears are in engagement with the sun gear 118 whereas the upper portions are in engagement with a sun gear 126 formed as a part of the output sleeve or shaft 48. It will be seen that by means of the differential gearing thus provided the summation of the movements of the shafts 44 and 47 is transmitted to the shaft 48, whereby the shaft 48 represents the total actuation or movement of both meters 31 and 32. The particular details of the differential gearing are not material to the invention, except as they enter into the general combination.

Inasmuch as the fluid variator 28 merely divides up the fluid flow, the summation of the movements of the meters 31 and 32, in all positions of the fluid variator, represents the total volume of flow within the dispensing line to be delivered from the dispensing nozzle. Accordingly, the shaft 48 may be utilized to drive the total gallons register 50, whereby to register the total volume of liquid dispensed.

To insure uniformity of action within the casing of the fluid variator, and to insure uniformity of operation of the variator disc holes on either side of the baffle wall 57, it may be desirable to insure equalized pressure conditions within the chambers 58 and 59. One preferred arrangement to effect such result is illustrated in Figs. 8 and 9. As shown, a fitting 130, Fig. 8, is arranged in the pipe 29 and a similar fitting 131 is arranged in the pipe 30. The fitting 131 is provided with an auxiliary or end portion 132 flanged and secured to the main body of the fitting by means of bolts 133. A plate member 134 provided with openings for the passage of liquid is held in position by the end portion 132. Cooperating with the fixed plate member 134 is a slidable plate member 135 also provided with openings for the passage of liquid. This slidable plate member is pivotally connected to one end of a lever 136, the opposite end of which is pivotally connected as indicated at 137 to a spider 138 formed as a part of the fitting 131. Also pivotally connected to the lever 136, as indicated at 139, is a rod 140, the inner end of which is secured to a flexible diagram 141 of neoprene or other rubber-like flexible material. This diagram is held in place by means of bolts 142 between a pair of cup-like casing members 143 and 144 threadedly secured, respectively, to the fittings 130 and 131. An extension of the rod 140 is pivotally secured to a lever 145 disposed within the fitting 130, said lever being pivotally connected at its lower end to a spider 146 formed in the fitting and at its upper end to a slidable perforated plate 147 cooperable with a fixed perforated plate 148 held in place by an end portion 149 and the fitting 130.

When pressure conditions within the variator chambers 58 and 59 are equal, equal pressures will be transmitted to the opposite faces of the flexible diaphragm element 141, and the element will assume its mid or normal position as illustrated in Fig. 8. The arrangement is such that in this position of the parts whatever pressure drop occurs at the valve plates 134 and 135 and the valve plates 147 and 148, such pressure drop being substantially negligible at this time, is equal. However, should the pressure in chamber 58 tend to increase with respect to that in chamber 59, the diaphragm 141 will shift to the right as seen in Fig. 8 which movement brings the openings in plates 147 and 148 further into alinement but shifts the openings in plates 134 and 135 out of alinement to produce a restriction to the liquid flow within the pipe 30. Such restriction will increase the pressure in variator chamber 59. Conversely if the pressure in chamber 59 tends to increase above that in chamber 58, diaphragm 141 is shifted to the left as seen in Fig. 8 producing a restriction to flow within the pipe 29. The diaphragm 141 thus automatically assumes at all times a position maintaing equal pressure conditions within the chambers 58 and 59, thus insuring uniformity of action in the openings in the variator plates 73, 74 and 75 communicating with either chamber.

The operation of the structure is believed to be clear. As the nozzle support 21 is raised energizing the motor 15 by means of the switch 19, pump 13 operates to propel fluid through the dispensing line. In the fluid variator 28 the fluid is divided in accordance with the desired unit price per unit of volume, part of the flow passing through the pipe 29 to be measured by the meter 31, and the balance of the flow being transmitted through the pipe 30 to be measured by the meter 32. The movements of the meter 31, which are proportional to the cost of the liquid being dispensed, serve to operate the cost register 52, whereas the combined movements of both meters, representative of the volume of fluid being dispensed, operate the volume register 50. By means of the control valve structure of Fig. 8, equalized pressure conditions are maintained within the fluid variator chambers 58 and 59, and by means of the adjustment knobs 99, 102 and 103, Fig. 3, the variator discs may be preset so that the cost calculation takes place at the selected price per gallon.

In accordance with the structure provided, the meters are subjected to a minimum driving load, as there are no mechanical variators or other heavy gearings to be operated. Meter inertia is thus minimized and accuracy is promoted. No adjustment mechanism of the meters is provided for varying or modifying the displacement or operating characteristics thereof in accordance with the price changes, and costly and cumbersome mechanical variator mechanisms are eliminated. Normally, and except when the apparatus is dispensing liquid at abnormally low or abnormally high unit prices, the fluid flow between the two meters is well divided, the meters collectively transmitting the fluid flow dispensed through the nozzle 22.

The variator discs may take various forms and arrangements, and they may be arranged in side by side relationship as shown in Fig. 6, or suitably superposed one upon the other. Also the openings therethrough may be shaped and formed in any desired manner, and variously arranged.

It is to be understood that while the openings in the variator discs operate as flow dividing orifices, the collective area thereof is sufficiently large so as to produce no substantial impediment to the liquid flow therethrough even when the pump 13 is delivering at its maximum dispensing rate. It will also be understood that the openings in discs 147 and 148, and 134, 135 when in the position of Fig. 8, are such as to produce no substantial pressure drop even when the pipe 29 or the pipe 30, as the case may be, is transmitting substantially the entire liquid flow.

This application is a continuation-in-part of my prior copending application, Serial No. 468,363, filed December 9, 1942, and entitled "Liquid dispensing apparatus."

It is obvious that various changes may be made in the specific embodiment set forth for purposes of illustration without departing from the spirit of the invention. The invention is accordingly not to be limited to the specific embodiment shown and described, but only as indicated in the following claims.

The invention is hereby claimed as follows:

1. Fluid dispensing apparatus comprising a dispensing line adapted to be connected to a source of fluid supply, said dispensing line terminating in a dispensing outlet, means to propel fluid through the dispensing line, a plurality of fluid measuring meters disposed in said line, a single register driven conjointly by said meters, and means calibrated in accordance with the unit cost of the fluid dispensed per unit of volume for controlling the fluid flow through each of said meters.

2. Fluid dispensing apparatus comprising a dispensing line adapted to be connected to a source of fluid supply, said dispensing line terminating in a dispensing outlet, means to propel fluid through the dispensing line, a plurality of fluid measuring meters disposed in parallel branches in said line, a single register driven conjointly by said meters, and means calibrated in accordance with the unit cost of the fluid dispensed per unit of volume for proportioning the fluid flow within each of said parallel dispensing line branches.

3. Fluid dispensing apparatus comprising a dispensing line adapted to be connected to a source of fluid supply, said dispensing line terminating in a dispensing outlet, means to propel fluid through the dispensing line, a plurality of fluid measuring meters disposed in said line, a first register driven by one of said meters, a second register driven conjointly by both of said meters, and means calibrated in accordance with a function of the fluid registered by at least one of said registers for controlling the flow of fluid to said meters.

4. Fluid dispensing apparatus comprising a dispensing line adapted to be connected to a source of fluid supply, said dispensing line terminating in a dispensing outlet, means to propel fluid through the dispensing line, a plurality of fluid measuring meters disposed in parallel in said line, a first register driven by one of said meters, a second register driven conjointly by both said meters, and means calibrated in accordance with a function of the fluid registered by at least one of said registers for controlling the flow of fluid to said meters.

5. Fluid dispensing apparatus comprising a dispensing line adapted to be connected to a source of fluid supply, said dispensing line terminating in a dispensing outlet, means to propel fluid through the dispensing line, a plurality of fluid measuring meters disposed in parallel branches in said line, a register, drive connections including a differential gearing connecting said register and both said meters, and means calibrated in accordance with the unit cost of the fluid dispensed per unit of volume for proportioning the fluid flow within each of said parallel dispensing line branches.

6. Fluid dispensing apparatus comprising a dispensing line adapted to be connected to a source of fluid supply, said dispensing line terminating in a dispensing outlet, means to propel fluid through the dispensing line, a plurality of fluid measuring meters disposed in said line, a first register, drive connections between one of said meters and said register, a second register, drive connections including a differential gearing arranged between said second register and both said meters, and means calibrated in accordance with a function of the fluid registered by at least one of said registers for controlling the flow of fluid to said meters.

7. Fluid dispensing apparatus comprising a dispensing line adapted to be connected to a source of fluid supply, said dispensing line terminating in a dispensing outlet, means to propel fluid through the dispensing line, a plurality of fluid measuring meters disposed in parallel in said line, a first register, drive connections between said register and one of said meters, a second register, drive connections including a differential gearing between said second register and both said meters, and means calibrated in accordance with a function of the fluid registered by at least one of said registers for controlling the flow of fluid to said meters.

8. Fluid dispensing apparatus comprising a dispensing line adapted to be connected to a source of fluid supply, said dispensing line terminating in a dispensing outlet, means to propel fluid through the dispensing line, a plurality of fluid measuring meters disposed in parallel in said line, variator mechanism for proportioning the fluid flow between both of said meters, in accordance with a given function of the dispensed fluid, and an indicator calibrated in accordance with said function controlled by the variator mechanism.

9. Fluid dispensing apparatus comprising a dispensing line adapted to be connected to a source of fluid supply, said dispensing line terminating in a dispensing outlet, means to propel fluid through the dispensing line, a plurality of fluid measuring meters disposed in parallel in said line, variator mechanism comprising a plurality of shiftable discs each having a plurality of orifices formed therein for proportioning the fluid flow between said meters in accordance with a given function of the dispensed fluid, an indicator calibrated in accordance with said function controlled by the variator mechanism, and a single register driven conjointly by said meters.

10. Fluid dispensing apparatus comprising a dispensing line adapted to be connected to a source of fluid supply, said dispensing line terminating in a dispensing outlet, means to propel fluid through the dispensing line, a plurality of fluid measuring meters disposed in parallel in said line, variator mechanism comprising a plurality of shiftable discs having orifices formed therein for proportioning the fluid flow between said meters, a first register driven by one of said meters, and a second register driven conjointly by both said meters.

11. Fluid dispensing apparatus comprising a dispensing line adapted to be connected to a source of fluid supply, said dispensing line terminating in a dispensing outlet, means to propel fluid through the dispensing line, a plurality of fluid measuring meters disposed in parallel in said line, variator mechanism for proportioning the fluid flow between both of said meters in accordance with a given function of the dispensed fluid, an indicator calibrated in accordance with said function controlled by the variator mechanism, a register, and drive connections including a differential gearing connecting said register and both said meters.

12. Fluid dispensing apparatus comprising a dispensing line adapted to be connected to a source of fluid supply, said dispensing line terminating in a dispensing outlet, means to propel fluid through the dispensing line, a plurality of fluid measuring meters disposed in parallel in said line, variator mechanism for proportioning the fluid flow between said meters, a first register, drive connections between said register and one of said meters, a second register, drive connections including a differential gearing arranged between said second register and both said meters, and means calibrated in accordance with a function of the fluid registered by at least one of said registers for controlling the flow of fluid to said meters.

13. Fluid dispensing apparatus as defined in claim 8, wherein means is provided for maintaining equal pressure conditions within the inlet connections leading to both said meters.

14. Fluid dispensing apparatus as defined in claim 8, wherein said variator mechanism includes a plurality of orifices for dividing the fluid between said meters.

15. Fluid dispensing apparatus as defined in claim 10, wherein said variator disc orifices are shiftable for selective cooperation with said meters to divide the fluid flow therebetween in accordance with the unit cost per unit of volume of the fluid dispensed, and wherein said first register includes means for registering the cost of the fluid dispensed, and the second register includes means for registering the volume of the fluid dispensed.

16. Fluid dispensing apparatus as defined in claim 12, wherein said variator includes shiftable means to divide the fluid flow between the meters in accordance with the unit cost per unit of volume of the fluid dispensed, and wherein said first register includes means for registering the cost of the fluid dispensed, and the second register includes means for registering the volume of the fluid dispensed.

17. Fluid dispensing apparatus comprising a dispensing line adapted to be connected to a source of fluid supply, said dispensing line terminating in a dispensing outlet and having one portion thereof formed into a pair of parallel branches, means to propel fluid through the dispensing line, a plurality of fluid measuring meters disposed in said parallel branches, valve means for maintaining equal pressure conditions in said parallel branches on the inlet sides of the meters, and a single register driven conjointly by said meters.

RICHARD R. TREXLER.